United States Patent [19]
Tabbara

[11] Patent Number: 6,148,296
[45] Date of Patent: Nov. 14, 2000

[54] AUTOMATIC GENERATION OF DATABASE QUERIES

[75] Inventor: Bassam Tabbara, Seattle, Wash.

[73] Assignee: Microsoft, Inc., Redmond, Wash.

[21] Appl. No.: 09/018,287

[22] Filed: Feb. 4, 1998

[51] Int. Cl.[7] .................................................. G06F 17/30
[52] U.S. Cl. ...................... 707/3; 707/2; 707/4; 707/100; 707/103; 707/104
[58] Field of Search .............................. 707/2, 3, 4, 103, 707/100, 104

[56] References Cited

U.S. PATENT DOCUMENTS

| | | | |
|---|---|---|---|
| 5,201,047 | 4/1993 | Maki et al. ................................ | 395/600 |
| 5,377,103 | 12/1994 | Lamberti et al. .................... | 364/419.08 |
| 5,519,855 | 5/1996 | Neeman et al. ......................... | 395/600 |
| 5,548,755 | 8/1996 | Leung et al. ............................ | 395/600 |
| 5,548,770 | 8/1996 | Bridges ................................... | 395/800 |
| 5,590,319 | 12/1996 | Cohen et al. ............................... | 707/4 |
| 5,590,321 | 12/1996 | Lin et al. .................................. | 707/10 |
| 5,600,831 | 2/1997 | Levy et al. .................................. | 707/2 |
| 5,615,337 | 3/1997 | Zimowski et al. ................. | 395/200.01 |
| 5,632,015 | 5/1997 | Zimowski et al. ................. | 395/200.01 |
| 5,666,526 | 9/1997 | Reiter et al. ................................ | 707/2 |
| 5,806,059 | 9/1998 | Tsuchida et al. ........................... | 707/2 |
| 5,812,840 | 9/1998 | Shwartz ...................................... | 707/4 |
| 5,842,212 | 11/1998 | Ballurio et al. ........................ | 707/100 |
| 5,857,180 | 1/1999 | Hallmark et al. ........................... | 707/2 |
| 5,890,150 | 3/1999 | Ushijima et al. ............................ | 707/3 |
| 5,893,095 | 4/1999 | Jain et al. ................................... | 707/6 |
| 5,896,530 | 4/1999 | White ......................................... | 707/1 |
| 5,983,237 | 11/1999 | Jain et al. ................................ | 707/104 |
| 5,999,664 | 12/1999 | Mahoney et al. ....................... | 382/305 |

*Primary Examiner*—Hosain T. Alam
*Assistant Examiner*—Jean M Corrielus
*Attorney, Agent, or Firm*—Schwegman, Lundberg, Woessner & Kluth, P.A.

[57] ABSTRACT

A computer program for automatically generating queries to a database management system (DBMS) is disclosed. The computer program receives a high level specification of the data sought to be retrieved from an application program. The high level specification includes the columns from which data is sought, and any constraints on the data to be retrieved from those columns such as filter constraints. The computer program also receives a context for the columns to be queried, so that it can be determined which tables of the DBMS the columns are associated with. The computer program further receives a specification of the schema of the DBMS, with the schema specifying the relationship between the various data storage entities of the DBMS. Using the high level specification and the schema, the computer program automatically generates queries to the DBMS seeking to reduce the complexity of the queries to speed execution, and to reduce the number of round trips between the computer program and the DBMS, also to enhance speed. For this purpose, queries may be separated into primary and secondary queries, and batched together, with secondary queries using data retrieved in a primary query in order to retrieve further data.

18 Claims, 7 Drawing Sheets

Microfiche Appendix Included
(3 Microfiche, 217 Pages)

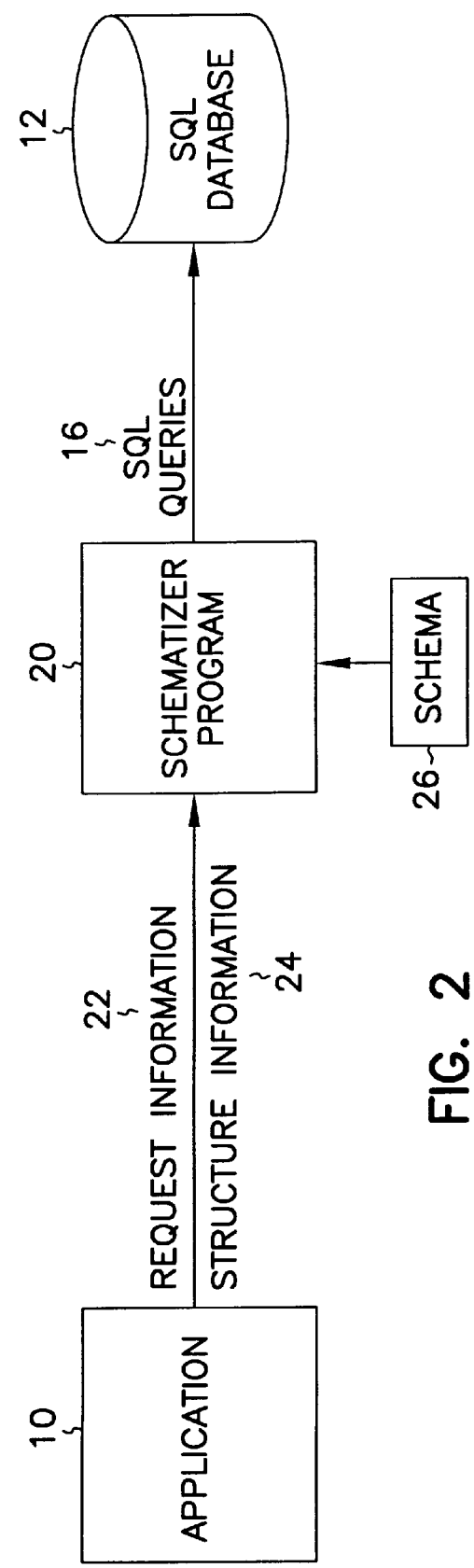

```
Title.TitleID 42
{
44  Title.TitleText [Alphabetical Sort Ascending] [>= 'S' AND < 'T']
    Title.ISBN                                              46
43  Title.Price
    Title.PublisherID  42
    {
    44  PersonPlace.Name
        Publisher.Comments
        Address.StreetAddress1
        Address.StreetAddress2
    45  Address.City
        Phone.AreaCode
        Phone.Number
        Phone.Extension
    }
    TitleAuthor.AuthorID  42
    {
    44  PersonPlace.Name
        Author.Organization
        Address.StreetAddress1
        Address.StreetAddress2
    47  Address.City
        Phone.AreaCode
        Phone.Number
        Phone.Extension
    }
}
```

FIG. 5

```
52 ⌒struct Saddress
    {
    53 ⌒char * pszStreetAddress1;
        char * pszStreetAddress2;
        char * pszCity;
    };
    struct Sphone
    {
        char * pszAreaCode;
        char * pszNumber;
        char * pszExtension;
    };
54 ⌒struct SPublisher
    {
        char * pszName;
        char * pszComments;
        SAddress * Address;
        SPhone * Phone;
    };
    struct SAuthor
    {
        char * pszName
        char * pszOrganization;
        SAddress * Address;
        SPhone * Phone;
    };
    struct STitle
    {
        char * pszText;
        char * pszISBN;
    55 ⌒float * pflPrice;
        SPublisher * Publisher;
        SAuthor * Authors;
    57 ⌒int cNumberOfAuthors;
    };
```

```
62 ⌐─CREATE PROC SCHEMATZ_ABCD1234 ─┐── 67
        @TitleText1 char,
        @TitleText2 char
    AS
    SELECT
        t.TitleText,                                    ── 60
        t.ISBN,
        t.Price,
        pp.Name,
        pub.Comments
    FROM
        Title t,
        Publisher pub,
        PersonPlace pp
    WHERE
        t.PublisherID = pub.PublisherID AND
        pp.PersonPlaceID = pub.PublisherID AND
        t.TitleText >= 'S' AND
        t.TitleText < 'T'

64 ⌐─CREATE PROC SCHEMATZ_4567ABCD ─┐── 67
        @PersonPlaceID int,
    AS
    SELECT
        StreetAddress1,
        StreetAddress2,
        City
    FROM
        Address
    WHERE
        PersonPlaceID = @PersonPlaceID SELECT
        AreaCode,
        Number,
        Extension
    FROM
        Phone
    WHERE
        PersonPlaceID = @PersonPlaceID 66 ⌐─CREATE SCHEAMTZ_1234EFAB ─┐── 67
        @TitleID int
    AS
    SELECT
        pp.Name,
        a.Organization
    FROM
        TitleAuthor ta,
        PersonPlace pp,
        Author a
    WHERE
        ta.AuthorID = a.AuthorID AND
        pp.PersonPlaceID = a.AuthorID AND
        ta.TitleID = @TitleID
```

FIG. 7

70 — EXEC SCHEMATZ_ABCD1234
GO

72 {
EXEC SCHEMATZ_4567ABCD 1
EXEC SCHEMATZ_4567ABCD 2
EXEC SCHEMATZ_4567ABCD 3
EXEC SCHEMATZ_4567ABCD 4
EXEC SCHEMATZ_4567ABCD 5
EXEC SCHEAMTZ_1234EFAB 1
EXEC SCHEAMTZ_1234EFAB 2
EXEC SCHEAMTZ_1234EFAB 3
EXEC SCHEAMTZ_1234EFAB 4
EXEC SCHEAMTZ_1234EFAB 5
GO

74 {
EXEC SCHEMATZ_4567ABCD 11
EXEC SCHEMATZ_4567ABCD 12
EXEC SCHEMATZ_4567ABCD 13
EXEC SCHEMATZ_4567ABCD 14
EXEC SCHEMATZ_4567ABCD 15
EXEC SCHEMATZ_4567ABCD 16
GO

FIG. 8

AUTOMATIC GENERATION OF DATABASE QUERIES

COPYRIGHT DISCLAIMER

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

MICROFICHE APPENDIX

Included herewith is a microfiche appendix of 3 pages and 217 frames of the source code of an example embodiment of the present invention.

TECHNICAL FIELD OF THE INVENTION

The present invention pertains generally to database technology, and more particularly to method and apparatus for facilitating database queries.

BACKGROUND OF THE INVENTION

Database Management Systems (DBMS) such as Microsoft® SQL Server, provide for storing and managing information. The majority of applications that need to access data stored in such a system go through a data access layer such as the Microsoft® Open Database Connectivity (ODBC) layer or the Microsoft® OLE database (OLEDB). These layers provide many services that make writing applications that need access to information stored in databases much easier. These services include running database queries and fetching result sets without having to know the underlying protocols need to communicate with the DBMS.

Most data access layers provide a way to pass database commands directly to the underlying DBMS. These commands are captured in a database language that is understood by the DBMS or can be readily translated using a DBMS driver. For example, ODBC uses SQL (Server Query Language) as the language for issuing commands to the DBMS. Database query languages are comprehensive and cover operations from fetching simple data sets to backing/restoring of databases. Most database applications, however, use only a small subset of the database query language, specifically commands that fetch and update the data sets.

Writing applications that rely heavily on reading and writing information to a database back-end is not trivial. In such applications, consideration must be given to efficiently retrieving data from the DBMS, or at least efficiently transferring requests and data between the front-end application and the DBMS. For example, in a web site application it is desirable for reasons of efficiency and speed to keep to a minimum the number of round trips between the web server and a server maintaining the DBMS. Another challenge in implementing a DBMS accessed through a front-end application is maintenance of the front-end code. Such code must accommodate changes in the underlying organization or schema of the DBMS tables, columns and constraints, and changes to the data sought by the front-end application for display or delivery to a user. It is undesirable to rewrite front-end code each time one of such changes is needed.

An example of a DBMS accessed through a front-end application is a web site that provides customers with an interface to browse and buy books online, wherein information about the books is stored in a SQL server database. When a user asks to display information about a book the web server retrieves the information from the database, renders it using HTML, and sends it back to the user. This effectively means that just about every user request will result in a database query. Also, changing and improving such a web site usually means that the queries going to the SQL server have to change, resulting in code maintenance. For example, if a display of a book's ISBN number is added to the web site, the query to the database must be changed to get the ISBN number in addition to the other information that had previously been retrieved. This may also mean that the underlying schema of the database might change. For example, if the ISBN number was not previously stored in the database it would have to be added, requiring that the underlying schema of the database might change. This change in schema may require that any existing code for executing requests be updated or changed. Obviously, it is desirable if rewriting of the code required to query a DBMS can be kept to a minimum.

Therefore, there is a need for system which can automatically generate queries based on a high level specification of the data required by the front-end application and from a high level description of the schema of the back end DBMS.

SUMMARY OF THE INVENTION

The schematizer program according to the present invention provides developers with a new way of accessing a database in a more abstract manner. Developers describe the operation that they want performed on the data and also describe the format of the results that they are expecting. The schematizer program of the present invention automatically formulates a desired request, with a bias towards better performance and scalability, and queries the underlying database and returns the results. Since the schematizer program deals with the underlying database the developer need not have a deep understanding of how to write database applications. The schematizer program greatly reduces the development effort required to access a database and allows easy development of database intensive applications that can yield higher performance and can scale. Since the schematizer program of the present invention generates code for database queries on an as-needed basis, there is no code to maintain.

The schematizer program according to the present invention provides a system for automatically generating queries to a back end DBMS using three types of inputs: 1) information about the schema of the DBMS, for example the names of tables and columns and the relationship between them; 2) information about the query operation that needs to be executed; and 3) information about the structure of the result set specifying how the result set should be returned.

According to one exemplary embodiment of the invention, the information about desired request includes: 1) "column" information about the query request expressed for example in terms of columns in the database to be returned and filter constraints on data in a column; 2) "context" information about the context of each query request, such as how to tie column information together, as identified by a "main key" information that identifies the context; and 3) "sort order" information specifying the sort order of final result set, or other information such as limits on the number of rows returned.

Using the above-noted inputs an example embodiment of the schematizer program of the present invention generates database language code for requests to the DBMS which attempt to: 1) reduce the complexity of any query generated, so that it can execute faster on the DBMS; and 2) reduce the number of round trips to the DBMS server, which is particularly important where the DBMS is on separate server from the server generating the SQL requests. Once the database language code is generated, the schematizer program of the present invention instructs the DBMS server to execute the requests or procedures.

According to an exemplary embodiment of the schematizer of the present invention queries are broken into primary and secondary queries according to established rules. Once the primary and secondary queries are formed, they are organized in batches that are transmitted from the front-end application to the DBMS.

BRIEF DESCRIPTION OF THE DRAWING

FIG. 1 illustrates a prior art configuration of an application and a database.

FIG. 2 illustrates the configuration of an example embodiment of a schematizer program of the present invention interposed between an application and a database.

FIG. 5 illustrates an example "request" input to an example embodiment of a schematizer program of the present invention.

FIG. 6 illustrates an example "result structure" input to an example embodiment of a schematizer program of the present invention.

FIG. 7 illustrates example code created by an example embodiment of a schematizer program according to the present invention.

FIG. 8 illustrates example queries created by an example embodiment of a schematizer program according to the present invention.

DETAILED DESCRIPTION OF THE INVENTION

Figure 3:
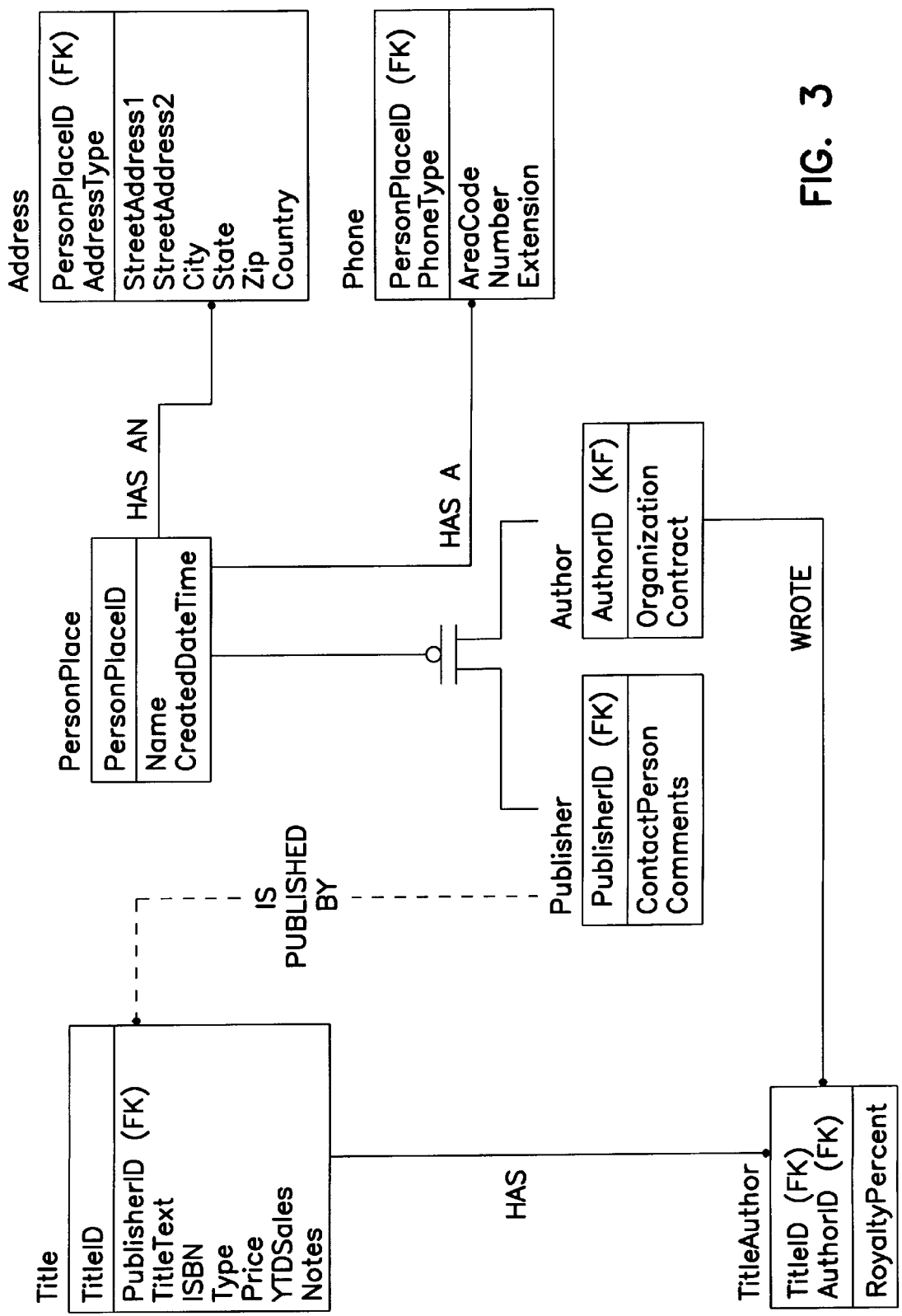
FIG. 3 illustrates an example database structure.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.
Overview Referring now to FIG. 1, there is shown a simplified diagram illustrating an example prior art configuration of an application 10 which queries a SQL database 12 over a link 14. Application 10 may, for example, be a web interface allowing visitors to access data in database 12. In this example, application 10 would reside on a web server. Database 12 may also be resident on the web server, or it may reside on a separate server. Where application 10 and database 12 are resident on the same server, link 14 is simply a software connection. In the case where the application 10 and database 12 are on different servers, link 14 may additionally include a computer network or a direct-cabled connection between the servers.

As discussed in the Background of the Invention above, in the most common prior art configurations application 10 may include coded SQL queries 16 that retrieve data from database 12 in response to requests 18 for data entered by a user at the front end of the application 10. In this manner, the user may be presented with a simplified front end interface with a set of standard data request options which allows access to a database 12 that may be of considerable complexity. Each data request option is typically implemented by a corresponding coded SQL query. The user thus need not learn or understand how to create or write a SQL request, as this is handled by the application 10. This configuration works well where both the application 10's data request options and the database 12's structure or schema remain static. Where either or both of these elements are routinely modified or changed, it can be burdensome or at least time consuming to rewrite the coded SQL queries to accommodate such changes.

Referring now to FIG. 2 there is illustrated one example embodiment of the schematizer program architecture according to the present invention. In the architecture of FIG. 2, a schematizer program 20 is interposed between the application 10 and the SQL database 12. Instead of providing SQL queries to database 12, application 10 provides what may be termed as a "schematizer query" to the schematizer program 20. The schematizer query is interpreted by the schematizer program 20, which in turn generates one or more SQL queries that are supplied to SQL database 12. It shall be noted that although the schematizer program 20 in this example generates queries in an SQL format, the invention is not so limited, and may be applied to generate queries in other protocols or formats.

Inputs To The Schematizer Program 20

As noted above, the schematizer program 20 receives a schematizer query from the application 10 and the schema 26 of the database to be queried. As noted in FIG. 2, a schematizer query includes, generally, information 22 on the data being requested and the structure 24 in which it should be returned to the application. As explained in more detail below, information 22 includes a specification of:

1) columns in the database to be returned;

2) constraints on results from a column, such as a filter;

3) a context for query as specified by a main key, to inform the schematizer program 20 how the column sought relates to other columns or tables as may be required to complete a request; and 4) the sort order of the final result set and, where applicable, other such information such as limits on the number of rows returned.

In a typical application for an SQL database, the schematizer program 20 is asked to return the result set in the form of C structures. Thus, in this case the structure 24 supplied to the schematizer program 20 will constitute a description of these C structures.

As noted above, the schematizer program 20 requires a context for each query. The function of a context is to identify how a database entity containing desired data is related to other entities that must be known in order for the schematizer program 20 to generate a desired query. Contexts are defined as follows:

1) each independent entity in the schema is in a separate context;

2) a context changes when moving across key spaces;

3) a context changes when moving across subtypes within the same keyspace.

FIG. 2 also illustrates that the schematizer program 20 is supplied with the schema 26 of the database to be queried. This schema captures the relationships and attributes of the data entities in the database to be queried.

FIG. 3 is an example schema for a database that might be maintained by a company that sells books on the web. The company in this example maintains a SQL server database of all the books in stock. As shown in FIG. 3, there are titles, publishers and authors stored in the database. The schema captures the relationships and attributes of these entities. For example, while a title can have one or many authors, a title can only have one required publisher. In this schema, a publisher and an author have a common set of attributes and so they are both subtypes of the PersonPlace entity which captures the information that is common between them, which in this case is Address and Phone.

In the schema of FIG. 3, TitleText and Price are columns from the Title table that may be requested in a data query. As a shortcut these are preferably represented in table.column syntax (e.g. Title.Price refers to the Price column in the Title table). If, for example, only titles that start with the letter 'S' were of interest, schematizer program 20 could apply a constraint on the Title.TitleText column. The syntax that is preferably used for this is table.column operator value (e.g. Title.TitleText>='S' and Title.TitleText<'T'). The Boolean logic between constraints also needs to be passed to Schematizer program 20.

As noted above the schematizer program 20 requires at least one context for each query request. The context tells the schematizer program 20 how to tie the column information together and helps it identify the relationships between the tables for this query. For example, the "Name" column in the PersonPlace table above can be either be the name of a publisher or an author. When schematizer program 20 is asked to retrieve the Name column it must be told which context it belongs to. As also noted above, the context is established by passing a main key. The main key is the key that identifies the context. For example, PublisherID is the key for all information related to publishers.

Operation Of The Schematizer Program

Once the schematizer program 20 has all the necessary inputs as described above, it prepares and executes a query and fetches the results. For each request, the schematizer program 20 attempts to:

1) reduce the complexity of any query generated, so that it can execute faster on the DBMS server; and
2) reduce the number of round trips to the DBMS server, i.e. the number of times a request is made to the DBMS server.

Figure 4:
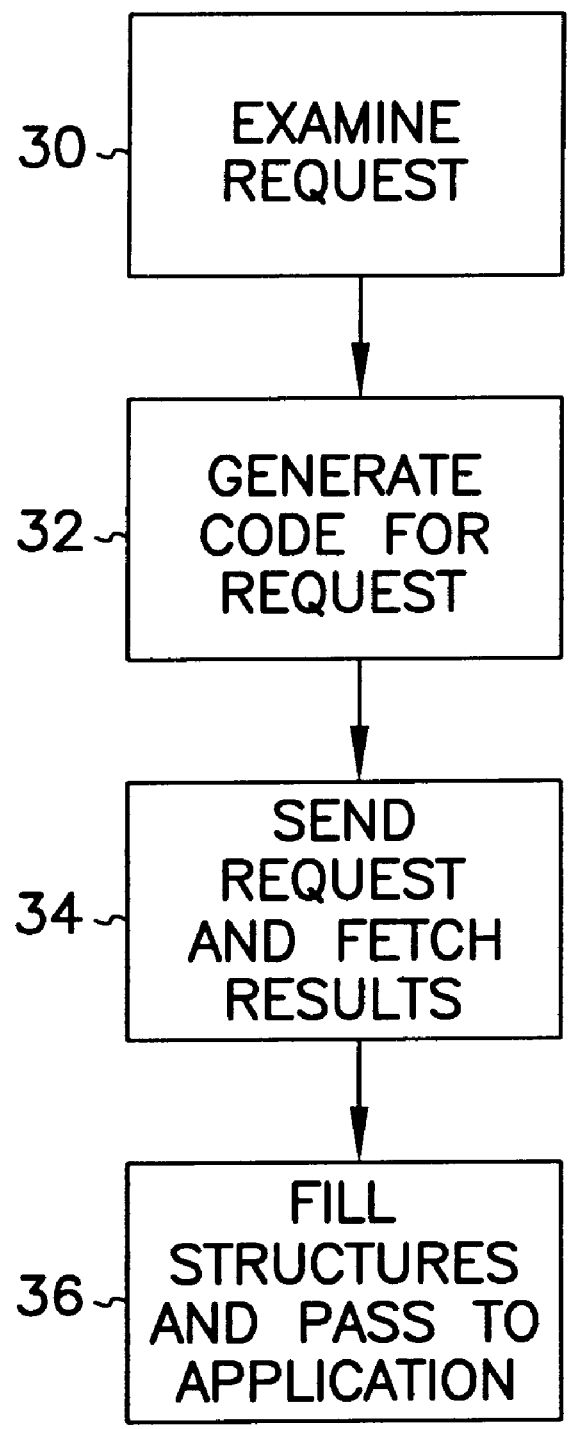
FIG. 4 illustrates a flow diagram of the operation of an example embodiment of a schematizer program according to the present invention.

Referring to FIG. 4, there is illustrated a flow chart of the operation of the schematizer program 20 according to one illustrative embodiment of the invention. The schematizer program 20 begins its operation by examining (30) the request received from the application 10. Database language code required for obtaining the desired results is then generated (32). Once the code for the request is generated, the request is sent to the DBMS server and the results are fetched (34). The structures specified by the application 10 for the results are then filled with the data and passed to the application 10 (36).

In generating queries, schematizer program 20 applies one or more of the following rules and goals:

1) queries are broken up to reduce the number of join operations, which can be slow to execute;
2) some queries are grouped together in batches in a single stored procedure (compiled collections of SQL statements and control-of-flow language that executes very quickly) in order to reduce the number of round-trips made to the SQL database;
3) the number of round-trips are reduced as much as possible while guaranteeing that the results will be as expected; and
4) queries are divided into primary and secondary queries, with primary queries obtaining a first set of information from that is then used to obtain the information desired from another entity in the secondary queries, and wherein a query can be both secondary to preceding query and primary to a succeeding query.

Preferably, the schematizer will cache the final DBMS queries for re-use in future sessions. The queries are identified by a 32-bit hash code. An example of this operation is given below.

Also, one example of the schematizer program 20 is attached in microfiche form in Appendix A. The sample program of Appendix A is written in C++, and can be executed on a Windows NT platform.

EXAMPLE OF OPERATION

Consideration of a simple example will help demonstrate the operation and benefits of the schematizer program 20. In particular, this example is made in reference to FIG. 3, and the operation of a schematizer program 20 to automatically generate SQL queries to the database of FIG. 3 and return the results to a Web site application. This example will now consider the case where an end-user has requested to see the title, price, author information, publisher information and ISBN number for all books that start with 'S', sorted alphabetically. FIG. 5 shows a simple representation 40 of the inputs sent to the schematizer program 20 in this example. Each set of curly braces establishes a context. The line just before the curly brace indicates the main key 42 of the context. For instance, the "Title.TitleID" main key 42 specifies that the columns 43 are related to the Title table, and indexed by TitleID. The main key "Title.PublisherID" preceding the columns 45 indicates those columns are related to the publisher of a title. The main key "TitleAuthor.AuthorID" indicates that columns 47 relate to the author of a title as specified in the TitleAuthor table. The latter two main keys thus specify a context for retrieving data from the Address, Phone tables and PersonPlace tables. Within the curly braces there is a list of columns 44 and/or constraints 46. In this case, the constraints specify that titles of books are to be sorted in ascending order, and filtered to include titles starting with the letter "S". FIG. 6 illustrates an example of the result structure 50 that is passed to the schematizer program 20. Structure 52 specifies, for instance, that "SAddress" in a structure that includes the alphanumeric characters ("char" 53) StreetAddress1, StreetAddress2 and City. The "SPublisher" structure 54 specifies that publisher information includes the Name, Comments, and data in the form defined by the SAddress and SPhone structures. The terms "float" 55 and "int" 57 designate that the form of that data is floating point and integer, respectively. The schematizer program 20 fills out this structure with the data fetched from the database, and returns it to the application.

Once the schematizer program 20 has all the inputs it can create a query, execute it, and fetch the results. As noted above, the schematizer program 20 starts by examining the whole request and generating the database language code required for obtaining the results. In this example, the database language code 60 illustrated in FIG. 7 is generated. In this example the code is written in SQL and the schematizer program 20 generates Stored Procedures 62, 64 and 66 for performance and re-use. There are many different ways that this SQL code could have been written to obtain the same results. As noted above, the schematizer program 20 breaks up the queries for performance reasons. Running SQL queries that include many tables requires many join operations and can result in slow queries, and so the schematizer program 20 breaks the queries up when there are dependencies between them. For example, the Address and Phone of the publisher is not considered as important to the final result set, and so schematizer program 20 split it into its own query. Notice also that the Address and Phone SQL queries are obtained in one stored procedure to reduce the number of round-trips made to the SQL server. Schematizer program 20 generates a single 32-bit hash code 67 to identify a unique query, e.g. 4567ABCD identifies a query that get Address and Phone information taking PersonPlaceID as input.

Once all the code that is needed to fetch the results is complete, schematizer program 20 will instruct the SQL server to execute the stored procedures. Schematizer program 20 attempts to reduce the number of round-trips to SQL while guaranteeing that the results are as expected. Let assume that there are five Titles that start with 'S' (with TitleID 1,2,3,4 and 5). Also assume that these five titles each have one author except Title 5 which has two authors (AuthorID 11,12,13,14,15,16). Schematizer program 20 will run the queries shown in FIG. 8. After the first "primary" query 70 is executed, schematizer program 20 has fetched all the information about the Titles that begin with 'S'. It has also obtained the IDs of these titles. Now, schematizer program 20 can go back for the Address and phone info for the publishers as well as the Author info, as accomplished with "secondary" query 72. At this point schematizer program 20 has fetched all information about the publishers and it also has the basic information about the Authors. It then goes back for the Address and Phone number of the authors, as accomplished by "secondary" query 74. Note that in this example, query 72 also serves as a "primary" query to obtain results needed to retrieve the results in query 74.

At this point all result sets have been fetched. The number of trips to the SQL server in this example was three (three GO statements). Also the information is fetched in the most optimal fashion and then assembled by schematizer program 20 in the output structures. For example, Author 15 and 16 both belong to Title 5 and schematizer program 20 will make that mapping in the structures.

If another request for same information is received again, the schematizer program 20 will re-use the existing code and not have to create the SQL code again. Schematizer program 20 can also cache the final results so that if someone runs the exact same query it will already be available and no SQL code has to be run.

Thus, the schematizer program 20 according to the present invention provides a number of benefits, including providing a centralized query engine, simplifying the process for requesting data from a DBMS server, automatic generation and optimization of query code, reuse of code where desirable, and the efficient handling of results, returning them in a logical view specified by the developer in an abstract manner. In addition, the schematizer is capable of caching retrieved data, and avoiding re-querying for data already retrieved.

Also, the schematizer program 20 supports SELECT, INSERT, DELETE and UPDATE operations (only SELECT operations described herein). Since the schematizer program 20 understands the schema for a database, it can make good decisions on queries based on that understanding. Performance gains obtained by the schematizer program 20 automatically apply to the whole application.

Thus, the schematizer program 20 according to the present invention provides method and apparatus that provides a high level interface between an application and a DBMS. In the illustrative embodiment described above, the schematizer program 20 allows database queries to be specified on a level which is semi-independent of the schema of the database sought to be queried, and allows that many adaptations to changes in the database can be accomplished automatically without the requirement of recoding requests in the application seeking the query. Furthermore, the schematizer program 20 allows for the relatively rapid development of queries allowing the requesting application to be easily modified to make new or different requests to the database.

What is claimed is:

1. A computerized method for automatically generating queries for and retrieving data from a database management system (DBMS) wherein the data held in the DBMS is organized and maintained in related data structures and wherein the relationship and organization of the data structures is specified by a schema, and wherein the DBMS receives and executes queries written in a code of a query language, the method comprising:

a) receiving a specification of a schema of a DBMS from which data is to be retrieved;

b) receiving a specification of a structure for holding data retrieved from the DBMS;

c) receiving a specification of the data sought to be retrieved from the DBMS;

d) using the specification of the schema and the specification of data sought to be retrieved automatically generating query language code to carry out two or more queries of the DBMS which will retrieve the sought after data, a first one of the queries being a primary query for retrieving a first set of data, and a second one of the queries being a secondary query for retrieving a second set of data, the secondary query using data retrieved in the primary query to obtain the second set of data;

e) automatically sending at least the first and second queries to the DBMS at different successive times and retrieving the associated data; and f) organizing at least some of the retrieved data into the specified structure for holding data retrieved from the DBMS.

2. A method according to claim 1 further wherein the specification of the data sought to be retrieved includes:

column information specifying a column in the database from which data is to be retrieved;

filter information specifying a subset of the data in a column; and context information specifying the relationship of the column to other data entities in the DBMS.

3. A method according to claim 1 further wherein at least some of the queries are organized in batches and sent to the DBMS in batches.

4. A method according to claim 1 further wherein the queries are generated substantially so as to reduce the complexity of individual queries to improve the speed of execution of the query by the DBMS.

5. A method according to claim 4 further wherein the queries are generated so that they reduce the number of round trips between the entity issuing the queries and the DBMS.

6. A method according to claim 1 further wherein the primary and secondary queries are organized according to the context of the data to be retrieved.

7. A system for automatically generating queries for and retrieving data from a database, comprising:

a database management system (DBMS) operating on a computer wherein data held in the DBMS is organized and maintained in related data structures and wherein the relationship and organization of the data structures is specified by a schema, and wherein the DBMS receives and executes queries written in a code of a query language;

an application program executing on a computer;

query generating program executing on a computer to perform the tasks of:
- a) receiving from the application program a specification of a schema of a DBMS from which data is to be retrieved,
- b) receiving from the application program a specification of a structure for holding data retrieved from the DBMS,
- c) receiving from the application program a specification of the data sought to be retrieved from the DBMS,
- d) using the specification of the schema and the specification of data sought to be retrieved automatically generating query language code to carry out two or more queries of the DBMS which will retrieve the sought after data, a first one of the queries being a primary query for retrieving a first set of data, and a second one of the queries being a secondary query for retrieving a second set of data, the secondary query using data retrieved in the primary query to obtain the second set of data,
- e) automatically sending at least the first and second queries to the DBMS at different successive times and retrieving the associated data;
- f) organizing at least some of the retrieved data into the specified structure for holding data retrieved from the DBMS; and
- g) sending the data held in the specified structure to the application program.

8. A system according to claim 7 further wherein the specification of the data sought to be retrieved includes:

column information specifying a column in the database from which data is to be retrieved;

filter information specifying a subset of the data in a column; and context information specifying the relationship of the column to other data entities in the DBMS.

9. A system according to claim 7 further wherein at least some of the queries are organized in batches and sent to the DBMS in batches.

10. A system according to claim 7 further wherein the queries are generated substantially so as to reduce the complexity of individual queries to improve the speed of execution of the query by the DBMS.

11. A system according to claim 10 further wherein the queries are generated so that they reduce the number of round trips between the entity issuing the queries and the DBMS.

12. A system according to claim 7 further wherein the primary and secondary queries are organized according to the context of the data to be retrieved.

13. An article of manufacture comprising computer program code recorded on a computer-readable media, the computer program code executable on a computer for automatically generating queries for and retrieving data from a database management system (DBMS) wherein the data held in the DBMS is organized and maintained in related data structures and wherein the relationship and organization of the data structures is specified by a schema, and wherein the DBMS receives and executes queries written in a code of a query language, the computer program code operating a computer to:
- g) receive a specification of a schema of a DBMS from which data is to be retrieved;
- h) receive a specification of a structure for holding data retrieved from the DBMS;
- i) receive a specification of the data sought to be retrieved from the DBMS;
- j) use the specification of the schema and the specification of data sought to be retrieved to automatically generate query language code to carry out two or more queries of the DBMS which will retrieve the sought after data, a first one of the queries being a primary query for retrieving a first set of data, and a second one of the queries being a secondary query for retrieving a second set of data, the secondary query using data retrieved in the primary query to obtain the second set of data;
- k) automatically send at least the first and second queries to the DBMS at different successive times and retrieving the associated data; and
- l) organize at least some of the retrieved data into the specified structure for holding data retrieved from the DBMS.

14. An article of manufacture according to claim 13 further wherein the specification of the data sought to be retrieved includes:

column information specifying a column in the database from which data is to be retrieved;

filter information specifying a subset of the data in a column; and context information specifying the relationship of the column to other data entities in the DBMS.

15. An article of manufacture according to claim 13 further wherein at least some of the queries are organized in batches and sent to the DBMS in batches.

16. An article of manufacture according to claim 13 further wherein the queries are generated substantially so as to reduce the complexity of individual queries to improve the speed of execution of the query by the DBMS.

17. An article of manufacture according to claim 16 further wherein the queries are generated so that they reduce the number of round trips between the entity issuing the queries and the DBMS.

18. An article of manufacture according to claim 13 further wherein the primary and secondary queries are organized according to the context of the data to be retrieved.

* * * * *